US009327824B2

United States Patent
Good et al.

(10) Patent No.: US 9,327,824 B2
(45) Date of Patent: May 3, 2016

(54) ADJUSTMENT OF WINGS FOR VARIABLE CAMBER FOR OPTIMUM TAKE-OFF AND LANDING

(75) Inventors: Mark Good, Seattle, WA (US); Paul Johnson, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 571 days.

(21) Appl. No.: 12/968,383

(22) Filed: Dec. 15, 2010

(65) Prior Publication Data

US 2012/0153085 A1    Jun. 21, 2012

(51) Int. Cl.
G05D 1/12        (2006.01)
B64C 13/00       (2006.01)
B64C 21/00       (2006.01)
B64C 9/20        (2006.01)
B64C 9/24        (2006.01)
B64C 13/16       (2006.01)

(52) U.S. Cl.
CPC ... B64C 9/20 (2013.01); B64C 9/24 (2013.01); B64C 13/16 (2013.01); Y02T 50/32 (2013.01); Y02T 50/44 (2013.01)

(58) Field of Classification Search
CPC .......... B64C 9/20; B64C 27/615; B64C 3/50; B64C 9/00; B64C 2009/143; B64C 2027/7266; B64C 9/06; B64C 9/12; B64C 17/00; B64C 2003/145; B64C 2009/005; B64C 25/10; B64C 25/18; Y02T 50/32; Y02T 50/145
USPC ........................ 244/99.2, 99.3, 75.1, 211–217
See application file for complete search history.

(56) References Cited

U.S. PATENT DOCUMENTS

| | | | | |
|---|---|---|---|---|
| 4,106,730 | A * | 8/1978 | Spitzer et al. | 244/183 |
| 6,465,902 | B1 * | 10/2002 | Beauchamp et al. | 290/55 |
| 7,494,094 | B2 | 2/2009 | Good | |
| 7,556,224 | B2 * | 7/2009 | Johnson et al. | 244/175 |
| 7,600,715 | B2 * | 10/2009 | Matsui | 244/99.6 |
| 7,641,152 | B2 | 1/2010 | Onu | |
| 7,726,610 | B2 * | 6/2010 | Good et al. | 244/217 |
| 8,234,019 | B2 * | 7/2012 | Todeschi et al. | 701/3 |
| 2003/0127569 | A1 * | 7/2003 | Bacon | G05D 1/0077 244/195 |

(Continued)

FOREIGN PATENT DOCUMENTS

| | | |
|---|---|---|
| CN | 101588964 A | 11/2009 |
| CN | 101909992 A | 12/2010 |
| DE | 102009017653 A1 * | 10/2010 |

OTHER PUBLICATIONS

Notification of First Office Action from State Intellectual Property Office of PRC dated Mar. 31, 2015 in corresponding China Application No. 201110434588.8, including Search Report.

Primary Examiner — Christopher P Ellis
Assistant Examiner — George Andonyan
(74) Attorney, Agent, or Firm — Ostrager Chong Flaherty & Broitman P.C.

(57) ABSTRACT

An aircraft wing system for differentially adjusting a first deployable lift device and a second deployable lift device on a wing during take-off and landing, the system having a controller, which is programmed to determine desired positions for the first and second deployable lift devices, based on a desired position signal, and to activate high and low horsepower motors to move the first deployable lift devices to desired positions. The system has a controller which determines an adjustment amount for each motor, based on the system architecture.

17 Claims, 9 Drawing Sheets

(56) References Cited

U.S. PATENT DOCUMENTS

| | | | |
|---|---|---|---|
| 2005/0151027 A1* | 7/2005 | Recksiek et al. | 244/211 |
| 2005/0151028 A1* | 7/2005 | Pohl | B64C 13/26 244/213 |
| 2006/0175468 A1* | 8/2006 | Huynh et al. | 244/212 |
| 2009/0206197 A1* | 8/2009 | Degenholtz et al. | 244/99.3 |
| 2009/0206209 A1* | 8/2009 | Good et al. | 244/76 A |
| 2010/0145554 A1 | 6/2010 | Todeschi et al. | |
| 2010/0237199 A1* | 9/2010 | Jackson | 244/190 |
| 2010/0282899 A1* | 11/2010 | Heintjes | B64C 13/28 244/99.5 |
| 2012/0032030 A1* | 2/2012 | Ruckes et al. | 244/215 |

* cited by examiner

ADJUSTMENT OF WINGS FOR VARIABLE CAMBER FOR OPTIMUM TAKE-OFF AND LANDING

TECHNICAL FIELD

This application is directed to systems and methods for moving trailing edge high lift devices on an aircraft wing, and more particularly to moving inboard, outboard and midspan flaps differentially in order to produce better lift/drag characteristics during takeoff and landing of the aircraft.

BACKGROUND

During takeoff and landing, trailing edge high lift devices, located on the trailing edge of airplane wings, are utilized to provide lift and to reduce stalling speed of the aircraft, at the cost of increased drag. Trailing edge high lift devices include surfaces such as flaps, which can move from a stowed position to a deployed position. The flaps may include inboard flaps, located closer to the fuselage, outboard flaps, located further away from the fuselage, and midspan flaps located between inboard and outboard flaps.

Flap control can be provided automatically by a controller within the aircraft or manually by a pilot moving a flaps lever or other control device to a desired position. Manual flap control is traditionally provided by setting a lever to a certain detent, which causes flaps to move to specific positions. For example, a pilot might set a flap lever to a detent such as "flaps 5", which would cause flaps to move by 25% of their full range of motion. Then, for example, a pilot might set a flap lever to a detent such as "flaps 10", which would cause flaps to move by an additional 10% of their full range of motion.

Presently, due to weight and spatial constraints, during take-off and landing, most aircraft move all flap surfaces on a wing in unison, with the same increment of their full range of motion for each detent. For example, a single power drive unit provides power equally to inboard and outboard flaps (and midspan flaps if they are present), which causes them to move to the same increment of their full range of motion. While this allows for simpler architecture, and requires only a single power drive unit, it is less than optimal. Due to wing shape, flap location, different airflow at different wing locations and other factors, the optimal amount of incremental motion between detent positions for different flap surfaces is not equivalent. Positioning the flaps to the same incremental motions during takeoff and landing therefore produces suboptimal drag/lift tradeoffs, which leads to decreased efficiency, increased fuel costs, and increased noise behavior due to flight path.

Presently, there are several methods to compensate for these drawbacks. One method is to determine a "trade-off" or "compromise" position for the flap surfaces, which is a position somewhere between the optimal positions for each flap surface. For example, in an aircraft having inboard, midspan and outboard flaps, if the optimal position for outboard flaps is 10% deflected, while the optimal position for midspan flaps is 13% deflected and for inboard flaps is 15% deflected, a "trade-off" position might be 12% deflection for all flaps. This trade-off provides best drag/lift tradeoffs, given the limitation that the inboard, midspan and outboard flaps are moved to the same increment. However, as the flaps are not in their optimal positions, further advantage could be gained by moving them differentially.

A second method to compensate for this drawback is to have multiple independent power drive units—one for each flap surface or pair of flap surfaces. This produces the benefit that inboard and outboard flaps (and midspan flaps if present) can be optimally positioned, but requires the additional parts and space needed for multiple independent drive trains, which adds weight and complexity to the aircraft.

Other systems exist that have the capability to move various flaps differentially during various phases of flight. However, no such system exists that is designed to move flaps differentially in a manner appropriate for takeoff and landing.

There is therefore a need for methods and systems for providing differential control of flap surface movement utilizing a single drive link to provide improved efficiency over the prior systems during take-off and landing.

SUMMARY

The present application is directed to systems and methods for enabling better fuel efficiency during landing and take-off by differentially adjusting flap surfaces using a single power drive link. The system might be implemented for a wing having inboard and outboard flaps, or a wing having inboard, outboard and midspan flaps, or with any number of flap surfaces, or may be used to adjust other control surfaces as appropriate.

The disclosed system has a controller for directing movement of flaps properly during take-off and landing. The controller produces optimal flap movement during takeoff and landing by properly adjusting flaps based on flap lever position. The system determines proper motor activation amount during take-off and landing for each flap lever position, based on current flap positions. These determinations may be made using additional information, such as aircraft speed, weight, and altitude.

This differential adjustment will provide the benefit that flaps may be optimally positioned instead of being positioned in a "trade-off" or compromise position during take-off and landing. This will provide benefits such as fuel efficiency. Additionally, the benefits may be obtained without requiring multiple drive links.

Accordingly, a method for differentially adjusting a first deployable lift device and a second deployable lift device on a wing, wherein said first deployable lift device and said second deployable lift device are coupled to a single power drive link is provided. The method comprises determining a first desired position for said first deployable lift device and a second desired position for said second deployable lift device, based on a desired position signal. A first motor is activated to move said first deployable lift device by a first total movement amount, said first total movement amount being determined by subtracting a first current position of said first deployable lift device from said first desired position. A second total movement amount for said second deployable lift device is determined a by subtracting a second current position of said second deployable lift device from said second desired position. A first differential movement amount is determined by subtracting said first movement amount from said total amount said second deployable lift device will move. A second motor is activated to move said second deployable lift device by first differential movement amount.

An aircraft wing system is also provided for differentially adjusting a first deployable lift device and a second deployable lift device on a wing. The system comprises a first deployable lift device, a second deployable lift device, wherein said first deployable lift device and said second deployable lift device are coupled to a single power drive link, a high horsepower motor providing power to said power drive link, a first low horsepower motor, a first differential configured to receive power from said drive link and said first low horsepower motor, and to provide power to said second deployable lift device, and a controller. The controller is programmed to do the following: determine a first desired position for said first deployable lift device and a second desired position for said second deployable lift device, based on a desired position signal; activate said high horsepower motor to move said first deployable lift device by a first total movement amount, said first total movement amount being determined by subtracting a first current position of said first deployable lift device from said first desired position; determine a second total movement amount for said second deployable lift device by subtracting a second current position of said second deployable lift device from said second desired position; determine a first differential movement amount by subtracting said first movement amount from said total amount said second deployable lift device will move; and activate said first low horsepower motor to move said second deployable lift device by first differential movement amount.

An aircraft is also provided, employing an aircraft wing system for differentially adjusting a first deployable lift device and a second deployable lift device. The aircraft comprises an aircraft body, a wing having a first deployable lift device and a second deployable lift device, wherein said first deployable lift device and said second deployable lift device are coupled to a single power drive link, a high horsepower motor providing power to said power drive link, a first low horsepower motor, a first differential configured to receive power from said drive link and said first low horsepower motor, and to provide power to said second deployable lift device, and a controller. The controller is programmed to do the following: determine a first desired position for said first deployable lift device and a second desired position for said second deployable lift device, based on a desired position signal; activate said high horsepower motor to move said first deployable lift device by a first total movement amount, said first total movement amount being determined by subtracting a first current position of said first deployable lift device from said first desired position; determine a second total movement amount for said second deployable lift device by subtracting a second current position of said second deployable lift device from said second desired position; determine a first differential movement amount by subtracting said first movement amount from said total amount said second deployable lift device will move; and activate said first low horsepower motor to move said second deployable lift device by first differential movement amount.

The features, functions, and advantages that have been discussed can be achieved independently in various embodiments disclosed herein, or may be combined in yet other embodiments, further details of which can be seen with reference to the following description and drawings. Other features and advantages of the embodiments disclosed herein will be explained in the following detailed description with reference to the drawings.

BRIEF DESCRIPTION OF THE DRAWINGS

Reference will hereinafter be made to the drawings in which similar elements in different drawings bear the same reference numerals.

DETAILED DESCRIPTION

Figure 1:
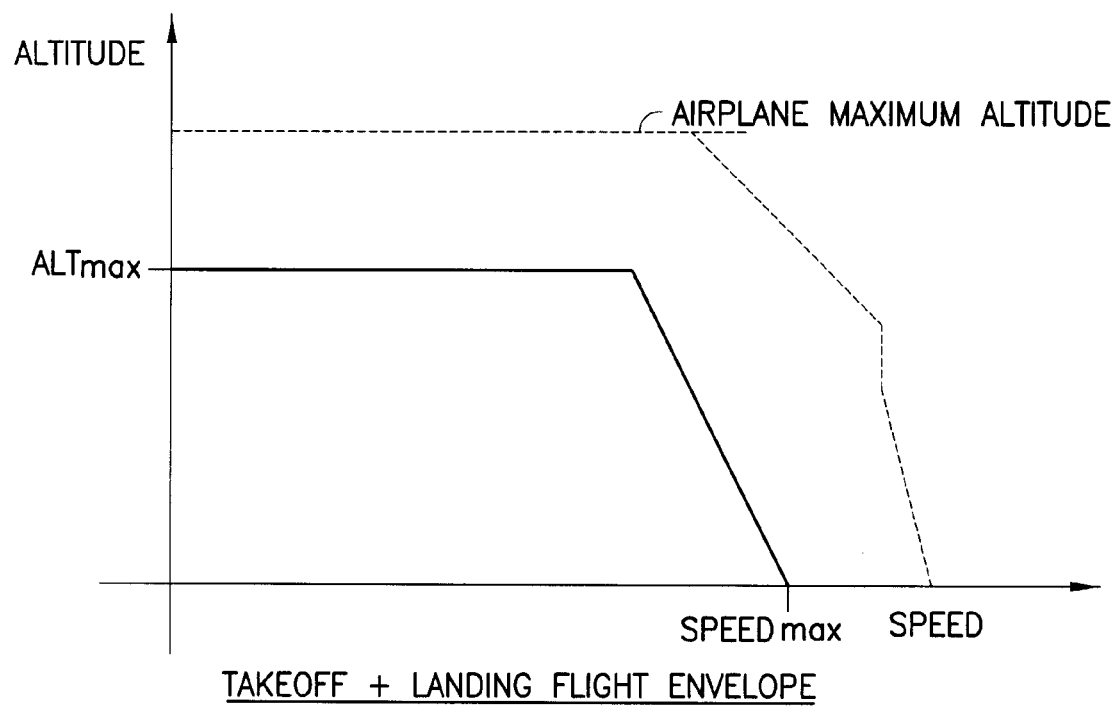
FIG. 1 is a graph showing a typical airplane flight operating within maximum altitude and speed boundaries and the target flight operating envelope for differential control of flaps in accordance with embodiments of the system disclosed herein.

In the following detailed description, certain preferred embodiments are described as illustrations in a specific application environment in order to provide a thorough understanding of the present disclosure. Those methods, procedures, components, or functions which are commonly known to persons of ordinary skill in the field of the disclosure are not described in detail so as not to unnecessarily obscure a concise description of the present disclosure. Certain specific embodiments or examples are given for purposes of illustration only, and it will be recognized by one skilled in the art that the teachings of this disclosure may be practiced in other analogous applications or environments and/or with other analogous or equivalent variations of the illustrative embodiments.

Some portions of the detailed description which follows are presented in terms of procedures, steps, logic blocks, processing, and other symbolic representations of operations within a computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system.

Unless specifically stated otherwise as apparent from the following discussions, it is appreciated that throughout the present disclosure, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A basic implementation of the teachings disclosed herein will now be described to show an exemplary embodiment of a system for differential adjustment of flap surfaces during take-off and landing. The example embodiment is implemented as an add-on control module to the system described in U.S. Pat. No. 7,726,610, entitled "Systems and Methods for Providing Differential Motion to Wing High Lift Device," and U.S. Pat. No. 7,494,094, entitled "Aircraft Wing Systems for Providing Differential Motion to Deployable Lift Devices," both of which are incorporated herein by reference. These patents describe systems implemented on aircraft having inboard and outboard flaps. Implementations of the teachings of the present disclosure will also be described with respect to systems for differentially controlling more than two flap surfaces, for example, an aircraft having inboard, outboard and midspan flaps.

Referring to FIG. 1, an exemplary embodiment is intended to operate within the flight envelope defined by the boundary parameters shown. The maximum altitude boundary of the flight envelope is the maximum altitude at which flaps would be deployed to increase lift for take-off and landing (ALTmax). The minimum altitude boundary is the altitude of the lowest airport the airplane is designed to operate from. The maximum speed boundaries within which the system operates is the maximum speed at which flaps would be deployed for takeoff or landing (SPEEDmax). The minimum speed boundary is zero knots.

Figure 2:
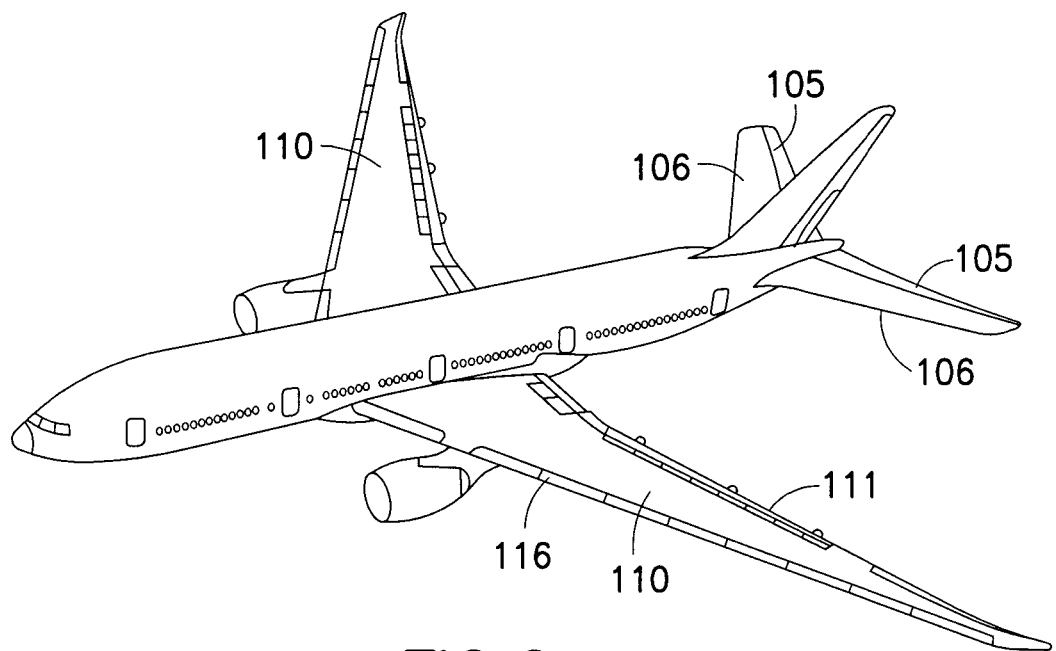
FIG. 2 is an illustration showing an overall view of typical airplane controllable camber surfaces on wing and empennage.

Referring to FIG. 2, an overall view of a typical commercial airliner shows its controllable camber surfaces including wing 110, wing trailing-edge devices 111, wing leading-edge devices 116, horizontal tail 106 and tail elevators 105. This exemplary embodiment is operative to adjust trailing devices 111 to provide optimal settings in the take-off and landing flight envelope.

Figure 3:
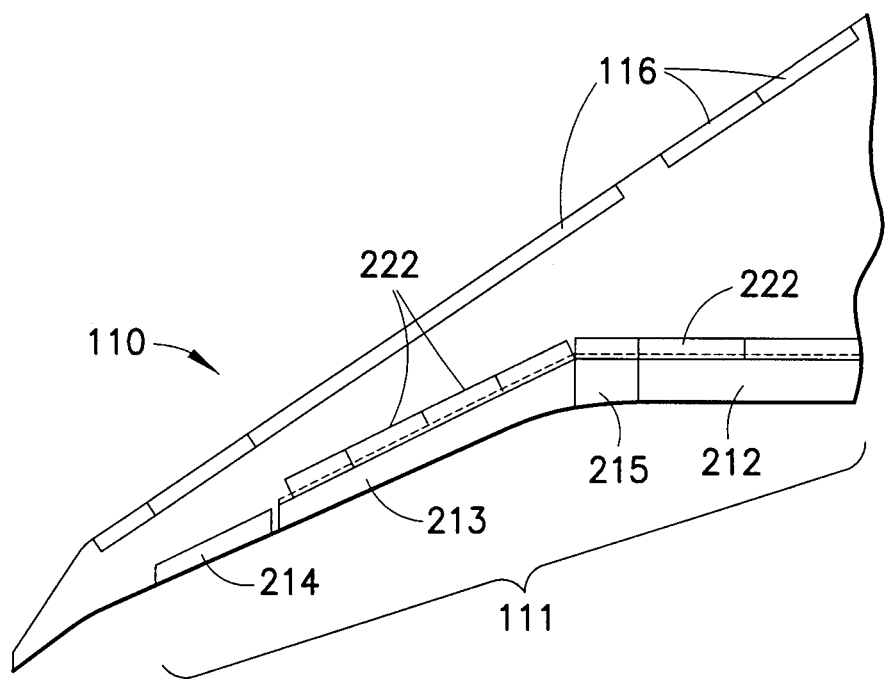
FIG. 3 is an illustration showing a detailed view of wing controllable camber surfaces, including inboard and outboard flaps.

Referring to FIG. 3, a detailed view shows typical wing camber surfaces including wing 110, wing trailing-edge devices 111, and wing leading-edge devices 116. In particular, the wing trailing-edge devices 111 include inboard trailing-edge flap 212, inboard roll-control flap device 215, outboard trailing-edge flap 213, outboard roll-control flap device 214, and spoilers 222. Camber characteristics of the flap devices 212 and 213 and can be adjusted appropriately during take-off and landing to provide optimal efficiency.

Figure 4:
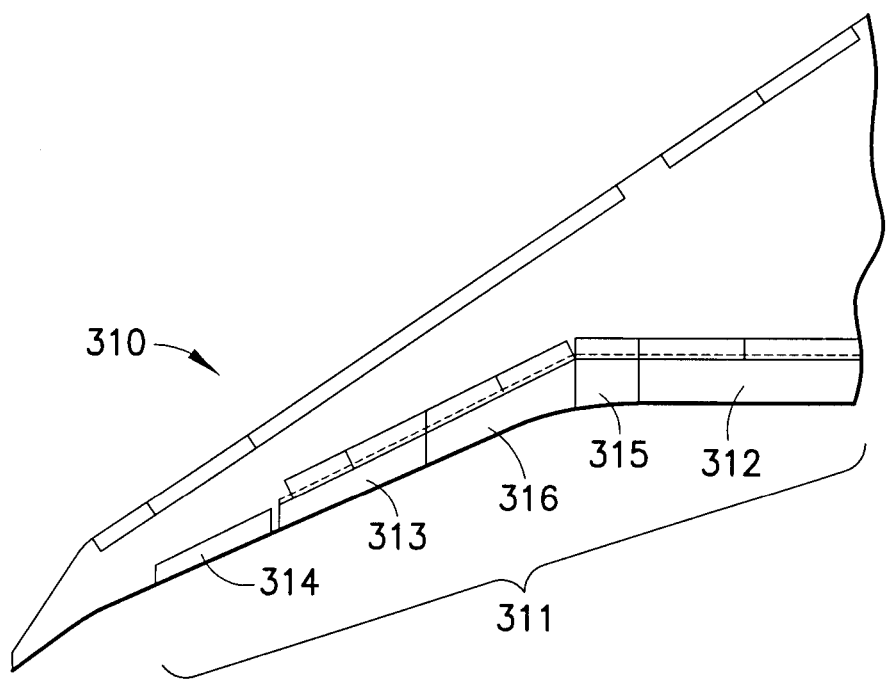
FIG. 4 is an illustration showing a detailed view of wing controllable camber surfaces, including inboard, outboard and midspan flaps.

Referring to FIG. 4, a detailed view shows an alternate wing 310 embodiment showing alternate wing trailing edge devices 311. The wing trailing-edge devices 311 include outboard trailing-edge flap 313, midspan trailing-edge flap 316 and inboard trailing-edge flap 312, as well as inboard roll-control flap device 315 and outboard roll-control flap device 314. The camber characteristics of the flap devices 312, 313 and 316 can be adjusted appropriately during take-off and landing to provide optimal efficiency.

Figure 5:
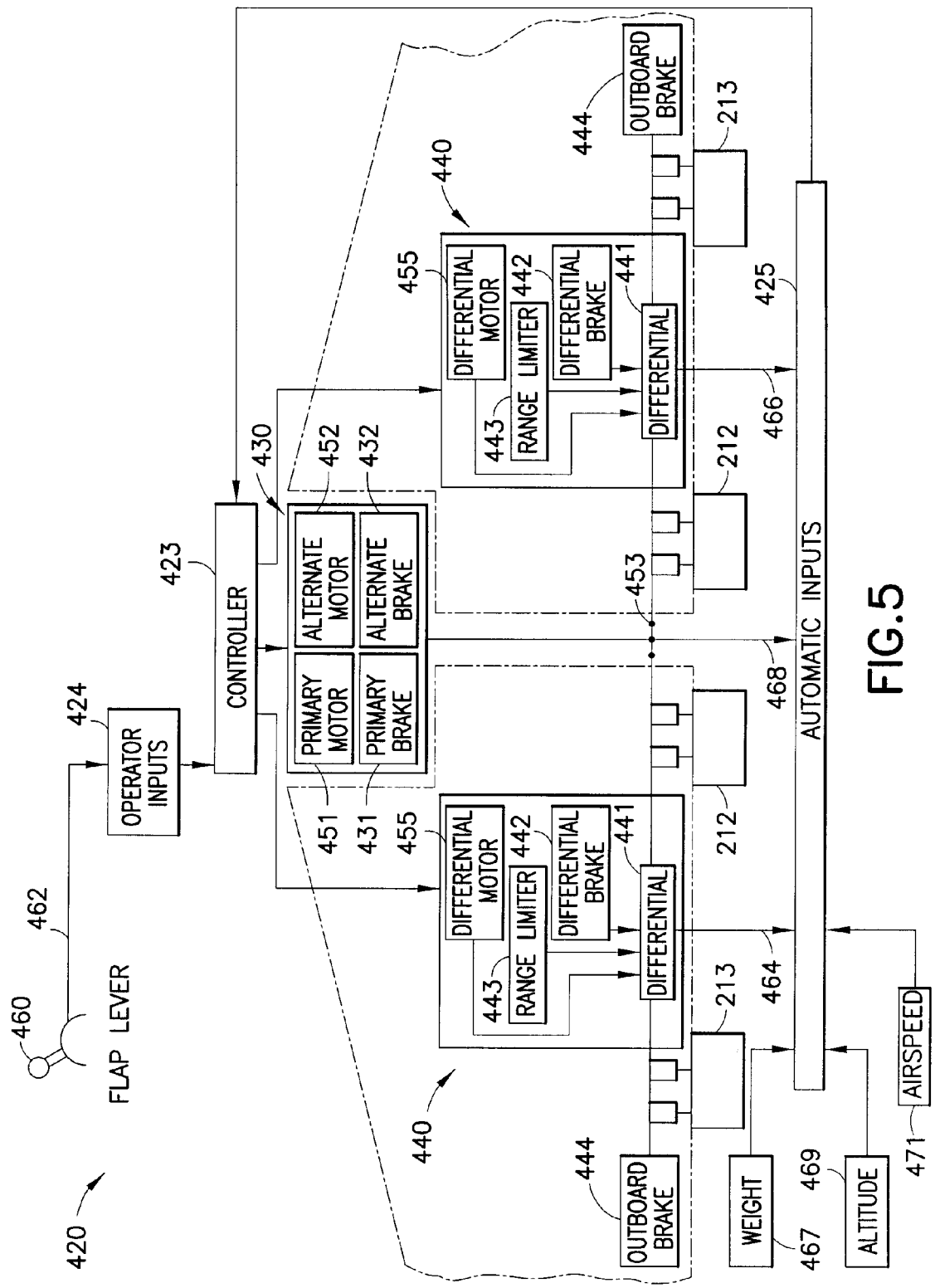
FIG. 5 is an illustration depicting an embodiment of a control system operatively connected to and controlling inboard and outboard flap positions during take-off and landing.

Referring to FIG. 5, a control system 420 configured to implement the control law of the present application, for moving inboard and outboard flaps differentially within the take-off and landing flight envelope is shown and described. The control system 420 may be implemented, for example, to control a wing as depicted in FIG. 3.

Controller 423 may be an electronic or other type of control device containing memory and a microprocessor, for accepting input, processing the input, and providing output commands in response to the inputs, for controlling the motors and other devices which will adjust flap position. Controller 423 is operatively coupled to a central control device 430 and two differential control devices 440. Controller 423 receives automatic inputs 425 and operator inputs 424. Operator inputs can include a flap lever position reading 462, determined from flap lever 460. Automatic inputs can include left differential position 464, right differential position 466 and inboard flap position 468. Left differential position 464 and right differential position 466 are absolute values—that is, they represent an absolute amount that differential motors 455 have moved from a "zero" position. Devices that can measure such "absolute" positions include rotary sensors, such as a rotary variable differential transformer, a resolver, or an optical encoder. Automatic inputs may also include airplane weight 467, airplane altitude 469 and airspeed 471. During take-off and landing, controller 423 will determine optimal movements for inboard flaps 212 and outboard flaps 213 and direct the central control device 430 and differential control devices 440 appropriately.

Central control device 430 has primary motor 451 and alternate motor 452, each of which power a drive link 453. Central control device 430 also has primary brake 431 and alternate brake 432 which selectively inhibit the motion of the primary motor 451 and alternate motor 452, respectively. Power provided to the drive link 453 may also be transferred through differential 441 to the outboard flaps 213.

Differential control devices 440 are provided which provide differential control for outboard flaps 213. Differential control device 440 preferably has a differential motor 455, differential brake 442, a differential 441, and range limiter 443. Range limiter 443 might be a physical device, or may be implemented in programmed instructions in controller 423 or in another control device.

The differential motor 455 provides power to the differential 441 to create differential motion between the inboard and outboard flaps. The differential 441 can receive power from both differential motor 455 and drive link 453, and can distribute power to inboard flap 212, outboard flap 213, or both. Accordingly, differential 441 can include a planetary gear device or other suitable mechanical differential, or similar hydraulic or electrical device, depending on the nature of the drive link 453. A range limiter 443 prevents differential motion of the outboard flaps 213 relative to the inboard flaps 212 past certain fixed bounds. As stated above, this range limiting function may be implemented entirely or partially within the programming of controller 423 or other programmable control device, and need not be implemented as a separate physical structure.

When the differential brake 442 is engaged, it prevents differential motion of the outboard flaps 213 with respect to inboard flaps 212 such that the differential control device 440 acts as a pass through gearbox with a fixed gear ratio. In this situation, inboard flaps 212 and outboard flaps 213 travel by the same amount.

When the differential brake 442 is not engaged, differential motor 455 can be utilized to move outboard flaps 213 differentially relative to inboard flaps 212. If primary motor 451 is providing power to drive link 453 in one direction and differential motor 455 is providing power in the same direction, then the outboard flap 213 will travel in the same direction, but farther than inboard flaps 212. If, on the other hand, primary motor 451 is providing power to drive link 453 in one direction and differential motor 455 is providing power in the opposite direction, then the outboard flap 213 will travel in the same direction, but not as far as the inboard flap 212.

An outboard brake 444 can be used to prevent motion of the outboard section of the drive link 453, and therefore prevent motion of the outboard flaps 213 while the inboard flaps 212 are in motion. If outboard brake 444 is engaged while differential brake is disengaged and the differential motor is engaged, differential motor 455 will move inboard flaps 212 while outboard flaps 213 remain stationary. While outboard brake 444 is shown in a physically separate location, outboard brake 444 may be included within differential control device 440.

To save weight and space, the differential motor 455 may be a lower horsepower motor than the primary 451 and/or alternate motor 452. As an example, the primary motor 451 may be a high horsepower hydraulic motor, having a horsepower of 40 Hp while the differential motor 455 may be a much lower horsepower electric motor of 3 Hp. It should be recognized that other types of motors may be used, and that the types described are merely exemplary. The goal of using motors having different horsepower amounts is to reduce space occupied and weight of structures on the wing.

Figure 6:
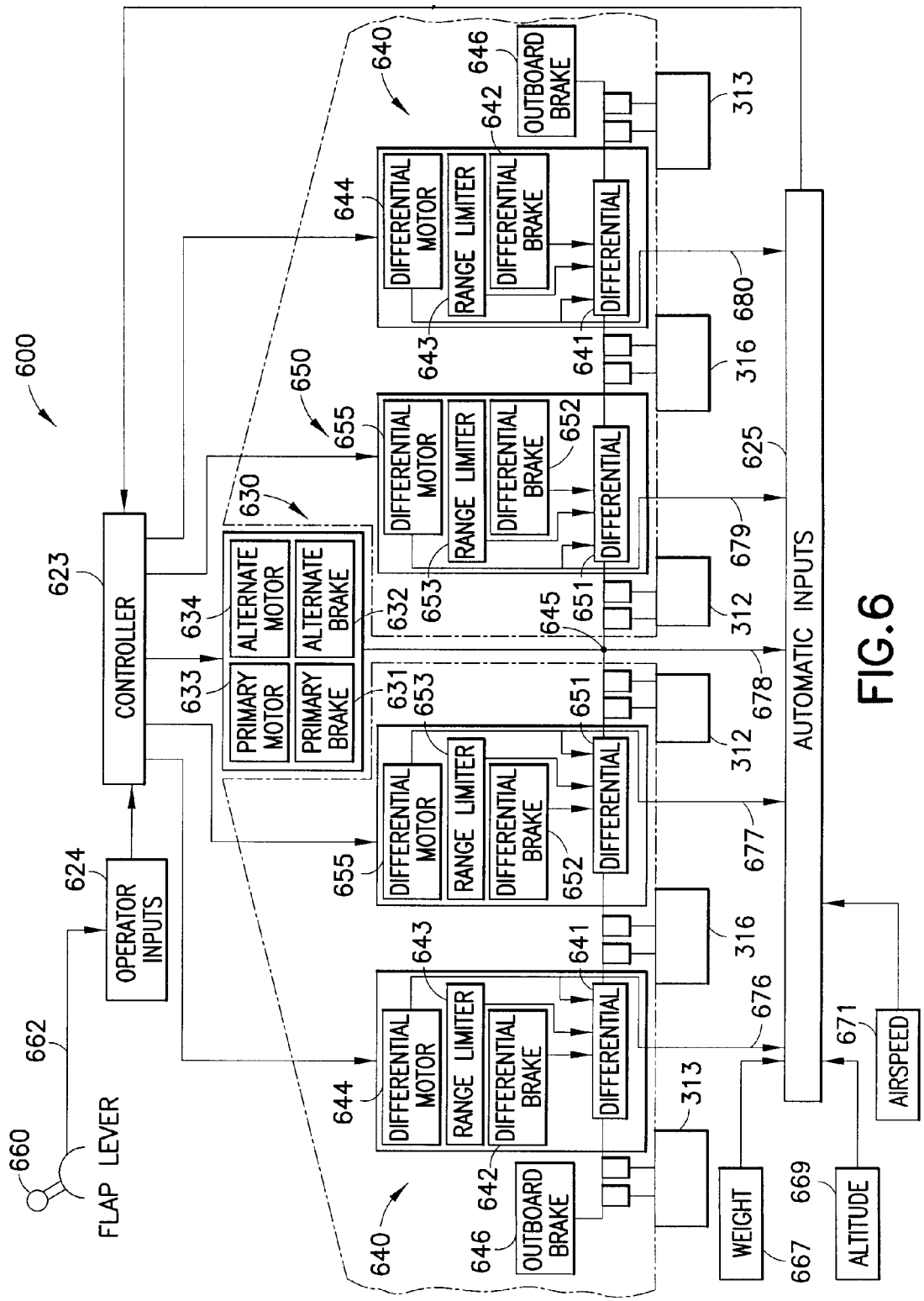
FIG. 6 is an illustration depicting an embodiment of a control system operatively connected to and controlling inboard, outboard and midspan flap positions during take-off and landing.

Referring to FIG. 6, a control system 600 configured to implement the control law of the present application, for moving inboard, outboard and midspan flaps differentially within the take-off and landing flight envelope is shown and described. The control system 600 may be implemented, for example, to control a wing as depicted in FIG. 4.

Controller 623 may be an electronic or other type of control device containing memory and a microprocessor, for accepting input, processing the input, and providing output commands in response to the inputs, for controlling the motors and other devices which will adjust flap position.

Controller 623 is operatively coupled to a central control device 630, midspan differential control devices 640 and outboard differential control devices 650. Controller 623 receives automatic inputs 625 and operator inputs 624. Operator inputs 625 can include a flap lever position reading 662, determined from flap lever 660. Automatic inputs can include left outboard differential position 676, right outboard differential position 680, left midspan differential position 677, right midspan differential position 679 and inboard flap position 678. As with the embodiment described with respect to FIG. 5, the differential positions 676, 677, 679, 680 represent absolute movement of the midspan and outboard differential motors 644, 655 from an initial "zero" position. Devices that can measure such "absolute" positions include rotary sensors, such as a rotary variable differential transformer, a resolver, or an optical encoder. Automatic inputs may also include airplane weight 667, airplane altitude 669 and airspeed 671. During take-off and landing, controller 623 will determine optimal movements for inboard flaps 312, outboard flaps 313 and midspan flaps 316 and direct the central control device 630, outboard differential control devices 640 and midspan differential control devices 650 appropriately.

Central control device 630 has primary motor 653 and alternate motor 654, each of which power a drive link 645. Central control device 630 also has primary brake 631 and alternate brake 632 which selectively inhibit the motion of the primary motor 633 and alternate motor 634, respectively. Power provided to the drive link 645 may also be transferred to midspan flaps 316 and outboard flaps 313.

Midspan differential control devices 650 are provided which provide differential control for midspan flaps 316 relative to inboard flaps 312. Midspan differential control device 650 preferably has a midspan differential motor 655, midspan differential brake 652, midspan differential 651, and midspan range limiter 653. Midspan range limiter 653 might be a physical device, or may be implemented in programmed instructions in controller 623 or in another control device.

Midspan differential motor 655 provides power to the midspan differential 651 to create differential motion between the inboard flaps 312 and the midspan flaps 316. This differential motion may be transferred to outboard flaps 313 depending on the state of outboard control device 640. This will be described in further detail below, with respect to FIG. 10. Midspan differential 651 can receive power from both midspan differential motor 655 and drive link 645, and can distribute power to inboard flap 312, outboard flap 313, midspan flaps 316, or any combination thereof. Accordingly, midspan differential 651 can include a planetary gear device or other suitable mechanical differential, or similar hydraulic or electrical device, depending on the nature of the drive link 653. Midspan range limiter 653 prevents differential motion of the midspan flaps 316 relative to the inboard flaps 312 and/or outboard flaps 313 past certain fixed bounds. As stated above, this range limiting function may be implemented entirely or partially within the programming of controller 623 or other programmable control device, and need not be implemented as a separate physical structure.

When the midspan differential brake 652 is engaged, it prevents differential motion of the midspan flaps 316 with respect to inboard flaps 312 such that the midspan differential control device 650 acts as a pass through gearbox with a fixed gear ratio. In this situation, midspan flaps 316 and inboard flaps 312 travel by the same amount. Engagement of midspan differential brake 652 does not necessitate that outboard flaps 313 travel by the same amount as midspan flaps 316 or inboard flaps 312.

When the midspan differential brake 652 is not engaged, midspan differential motor 655 can be utilized to move midspan flaps 316 and inboard flaps 312 differentially. If primary motor 633 is providing power to drive link 645 in one direction and midspan differential motor 655 is providing power in the same direction, then the midspan flap 316 will travel in the same direction, but farther than inboard flaps 312. If, on the other hand, primary motor 633 is providing power to drive link 645 in one direction and midspan differential motor 655 is providing power in the opposite direction, then the midspan flap 316 will travel in the same direction, but not as far as the inboard flap 312.

Outboard differential control devices 640 are provided which provide differential control for outboard flaps 313. Outboard differential control device 640 preferably has an outboard differential motor 644, outboard differential brake 642, outboard differential 641, and outboard range limiter 643. Outboard range limiter 643 might be a physical device, or may be implemented in programmed instructions in controller 623 or in another control device Outboard differential motor 644 provides power to the outboard differential 641 to create differential motion between the midspan flap 316 and outboard flaps 313. The outboard differential 641 can receive power from both outboard differential motor 644 and drive link 645, and can distribute power to midspan differential 641, outboard flap 313 or both. Accordingly, outboard differential 641 can include a planetary gear device or other suitable mechanical differential, or similar hydraulic or electrical device, depending on the nature of the drive link 645. An outboard range limiter 643 prevents differential motion of the outboard flaps 313 relative to the midspan flaps 316 past certain fixed bounds. As stated above, this range limiting function may be implemented entirely or partially within the programming of controller 623 or other programmable control device, and need not be implemented as a separate physical structure. Because midspan differential 651 can provide power to outboard flaps 313, motion of outboard flaps 313 will be dependent on the interaction between midspan differential control device 650 and primary control device 630, as described above.

When the outboard differential brake 642 is engaged, it prevents differential motion of the outboard flaps 313 with respect to midspan flaps 316 such that the outboard differential control device 640 acts as a pass through gearbox with a fixed gear ratio. In this situation, midspan flaps 316 and outboard flaps 313 travel by the same amount.

When the outboard differential brake 642 is not engaged, outboard differential motor 644 can be utilized to move outboard flaps 313 differentially. Outboard flaps 313 can receive power both from midspan differential 651 and from outboard differential motor 644.

If drive link 645 is providing power in one direction and outboard differential motor 644 is providing power in the same direction, then the outboard flap 313 will travel in the same direction, but farther than midspan flaps 316. If, on the other hand, midspan differential 651 is providing power in one direction and outboard differential motor 644 is providing power in the opposite direction, then the outboard flap 313 will travel in the same direction, but not as far as the midspan flap 316.

An outboard brake 646 can be used to prevent motion of the outboard section of the drive link 645, and therefore prevent motion of the outboard flaps 313 while the inboard flaps 312 and/or midspan flaps 316 are in motion. If outboard brake 646 is engaged while outboard differential brake 642 is disengaged and the outboard differential motor 644 is engaged, outboard differential motor 644 can provide power to midspan flap 316 and/or inboard flap 312 while outboard flap 313 remains stationary. While outboard brake 646 is shown in a physically separate location, outboard brake 646 may be included within outboard differential control device 640.

Differential motion is thus provided by the combination of central control device 630, outboard differential control devices 640 and midspan differential control devices 650.

To save weight and space, the midspan differential motor 655 and/or outboard differential motor 644 may be a lower horsepower motor than the primary 633 and/or alternate motor 634. As an example, the primary motor 633 may be a high horsepower hydraulic motor, having a horsepower of 40 Hp while the midspan differential motor 655 and/or outboard differential motor 644 may be a much lower horsepower electric motor of 3 Hp. It should be recognized that other types of motors may be used, and that the types described are merely exemplary. The goal of using motors having different horsepower amounts is to reduce space occupied and weight of structures on the wing.

Figure 7:
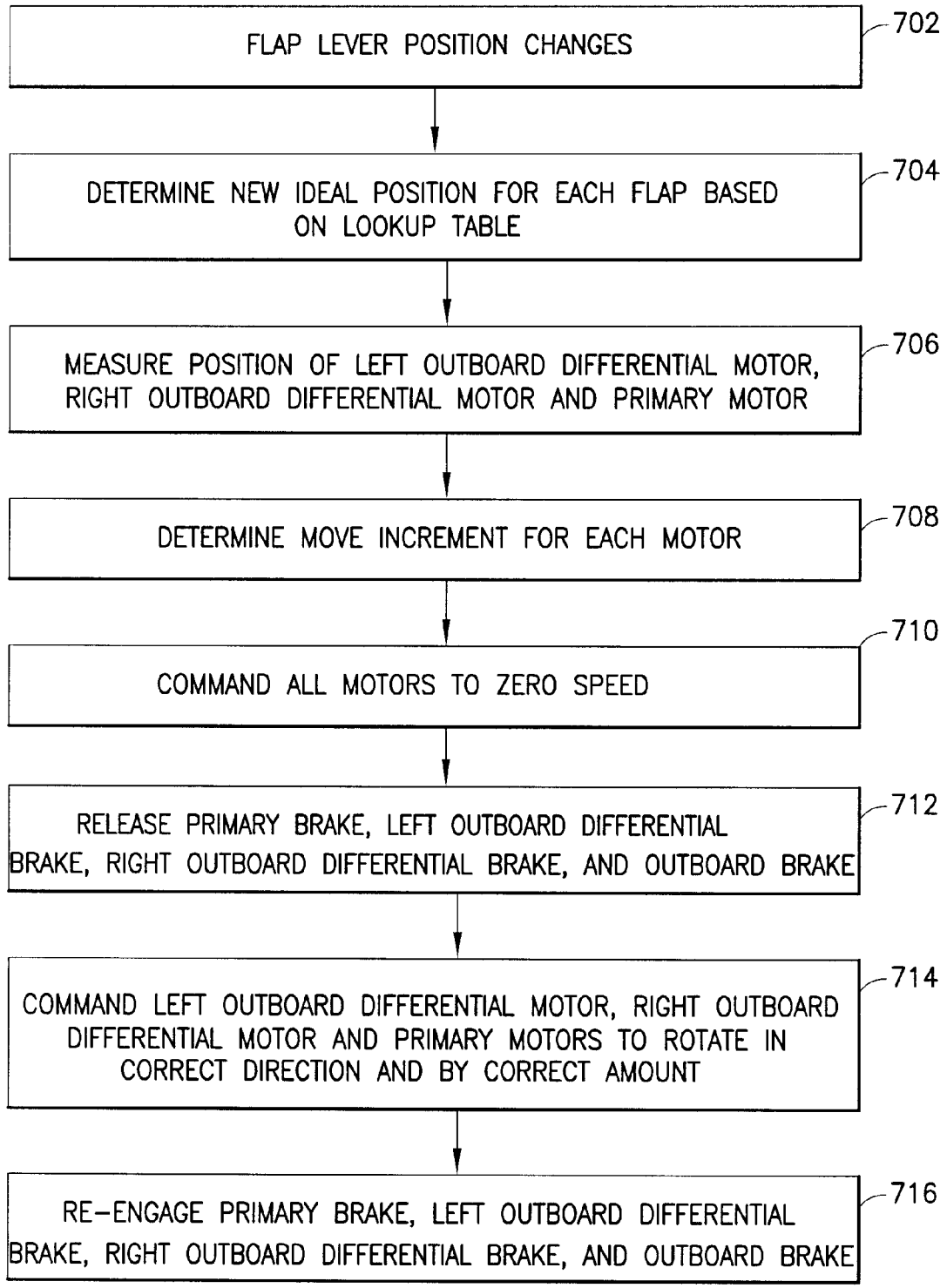
FIG. 7 is an illustration of steps for activating motors, brakes and other parts within primary and differential control devices, in order to achieve differential motion of inboard flaps with respect to outboard flaps.

Referring to FIG. 7, an illustration of the steps performed for controlling outboard and inboard flaps differentially is shown. These steps may be implemented, for example, on a wing and control system as depicted in FIGS. 3 and 5, respectively. The different parts are activated to bring inboard flaps 212 and outboard flaps 213 to their optimal positions. To move inboard flaps 212 and outboard flaps 213 differentially, differential motor 455 may be activated. It should be understood that differential control devices 440 on each wing may be controlled separately, to move left and right outboard flap surfaces to different positions.

In step 702, a flap lever position changes, and provides a signal 462 to controller 423 indicating that a change in flap position is desired. Although shown originating at a flap lever 460, it should be understood that flap lever signal 462 may come from other structures or devices, such as other physical devices used to manually command flaps, or from an automatic system which can automatically command flap position (for example, from "flap load relief" system which automatically readjusts flaps if pilot accelerates to an airspeed greater than the flap is designed for).

In step 704, new desired (or "ideal") flap positions for inboard and outboard flaps are determined from a lookup table. The lookup table accepts flap lever position signal (or "desired position signal") 462 as input, and may also accept airplane weight, airplane altitude and/or airspeed to more precisely determine ideal flap positions. Other variables that can assist in determining optimal flap surface positions may be used as inputs to the lookup table—the lookup table serves the purpose of providing ideal flap surface positions, given flap lever position during takeoff and landing. Other methods of determining ideal flap positions may also be used.

In step 706, the current positions of left outboard differential motor, right outboard differential motor, and primary motor are determined. A gauge or other device for determining these positions may be used.

In step 708, a move increment for each motor is determined. This will be described in further detail with regard to FIG. 9.

In step 710, all motors are commanded to zero speed. In step 712, primary brake, left differential brake, right differential brake and outboard brake are released, in order to allow primary motor to power drive link 453, and to allow outboard flaps 213 to move with respect to inboard flaps 212.

In step 714, left outboard motor, right outboard motor, and primary motors are commanded to move by the amount determined in step 708. In step 716, primary brake, left differential brake, right differential brake and outboard brake are re-engaged, preventing motion of all flap surfaces.

Figure 8:
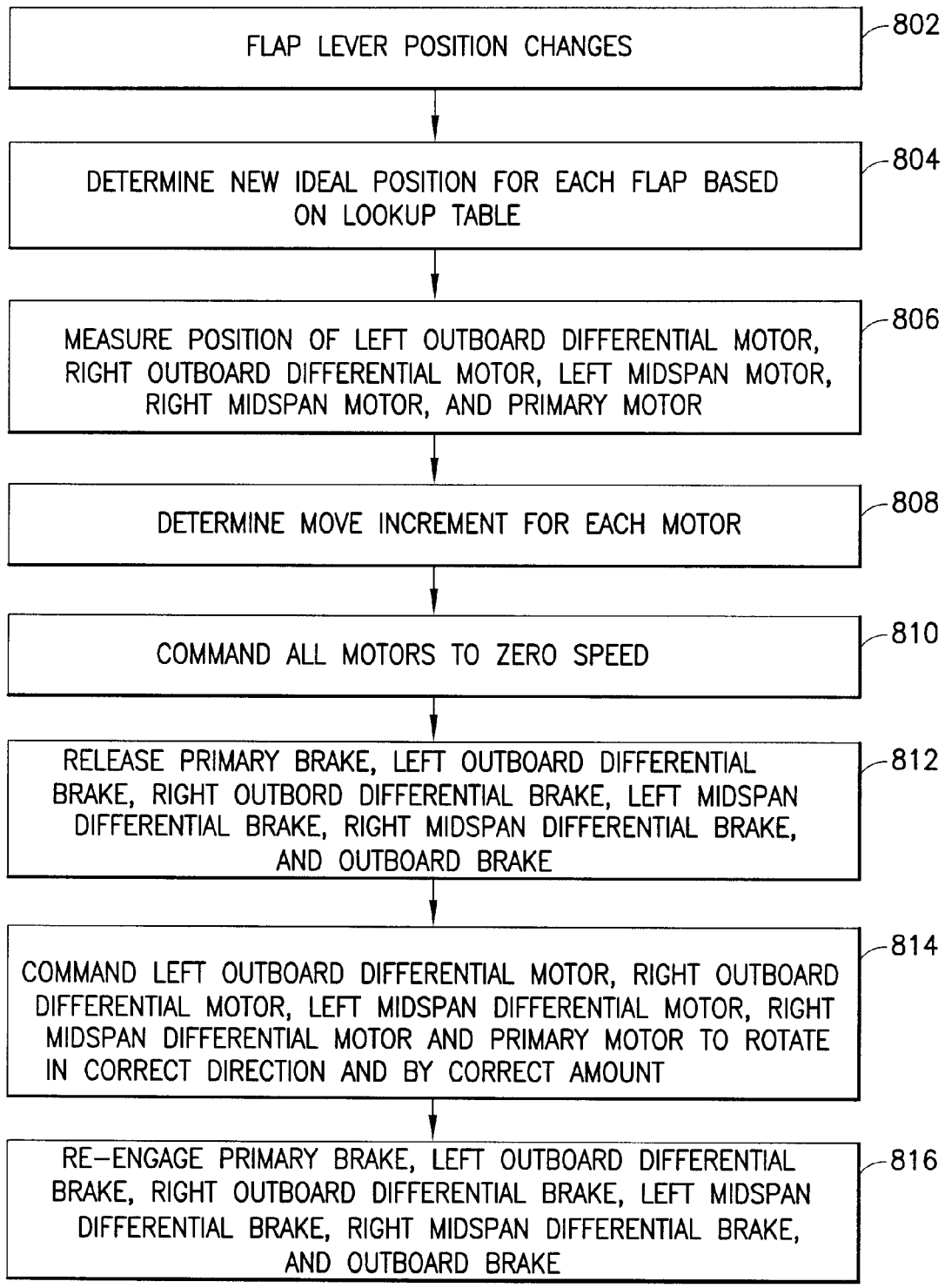
FIG. 8 is an illustration of steps for activating motors, brakes and other parts within primary and differential control devices, in order to achieve differential motion of inboard flaps and midspan flaps with respect to outboard flaps.

Referring to FIG. 8, an illustration of the steps performed by a control law for controlling outboard, midspan and inboard flaps differentially is shown. These steps may be implemented on a wing and control system, for example, as depicted in FIGS. 4 and 6, respectively. The different parts are activated to bring inboard flaps 312, midspan flaps 316 and outboard flaps 313 to their optimal positions. To move inboard flaps 312, midspan flaps 316 and outboard flaps 313 differentially, differential motors 655, 644 may be activated.

In step 802, a flap lever position changes, and provides a signal 662 to controller 623, indicating that a change in flap position is desired. Although shown originating at a flap lever 660, it should be understood that flap lever signal 662 may come from other structures or devices, such as other physical devices used to manually command flaps, or from an automatic system which can automatically command flap position.

In step 804, new desired (or "ideal") flap positions for inboard, midspan and outboard flaps are determined from a lookup table. The lookup table accepts flap lever position signal (or "desired position signal") 662 as input, and may also accept airplane weight, airplane altitude and/or airspeed to more precisely determine ideal flap positions. Other variables that can assist in determining optimal flap surface positions may be used as inputs to the lookup table—the lookup table serves the purpose of providing ideal flap surface positions, given flap lever position during takeoff and landing. Other methods of determining ideal flap positions may also be used.

In step 806, the current positions of left outboard differential motor, right outboard differential motor, left midspan motor, right midspan motor and primary motor are determined. A gauge or other device for determining these positions may be used.

In step 808, a move increment for each motor is determined. This will be described in further detail with regard to FIG. 10.

In step 810, all motors are commanded to zero speed. In step 812, primary brake, left outboard differential brake, right outboard differential brake, left midspan differential brake, right midspan differential brake and outboard brake are released, in order to allow primary motor to power drive link, and to allow outboard flaps, midspan flaps and inboard flaps to move with respect to each other.

In step 814, left outboard differential motor, right outboard differential motor, left midspan differential motor, right midspan differential motor, and primary motors are commanded to move by the amount determined in step 808. In step 816, primary brake, left outboard differential brake, right outboard differential brake, left midspan differential brake, right midspan differential brake and outboard brake are re-engaged, preventing motion of all flap surfaces.

Figure 9:
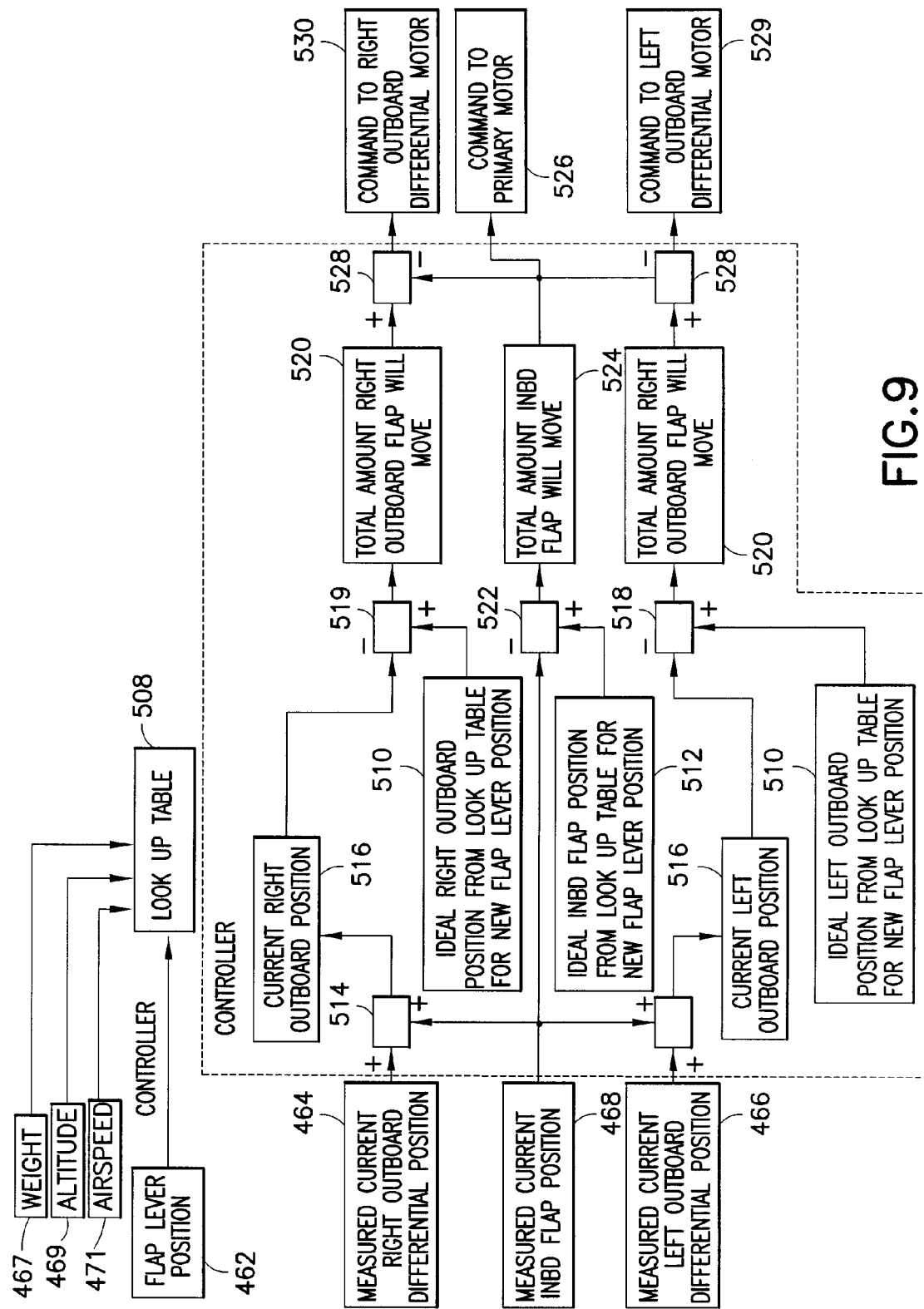
FIG. 9 is a block diagram depicting a control law for determining movement amount for controlling inboard and outboard flaps based on a flap lever position during take-off and landing.
Figure 10:
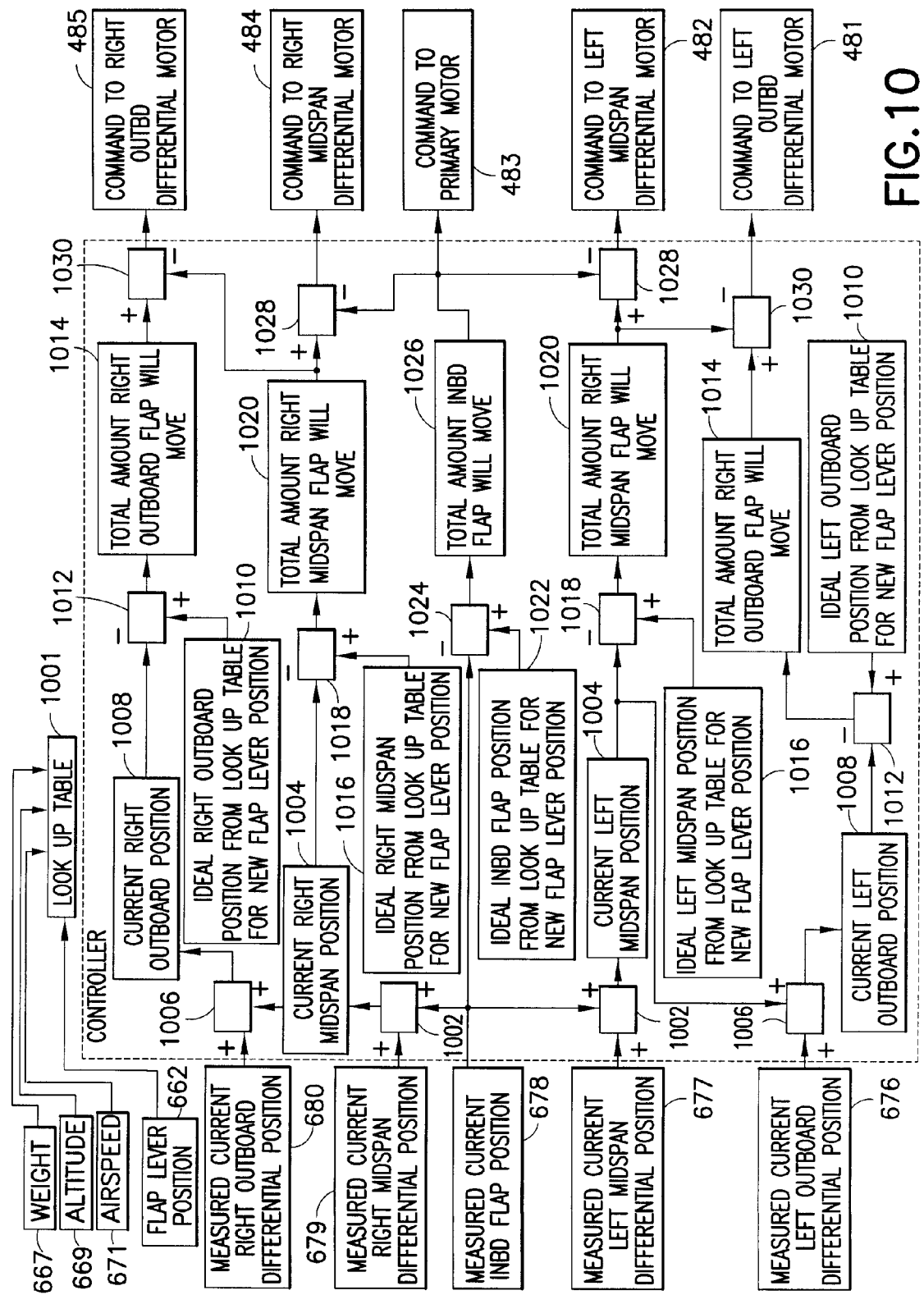
FIG. 10 is a block diagram depicting a control law for determining movement amount for controlling inboard, outboard and midspan flaps based on a flap lever position during take-off and landing.

Referring now to FIGS. 9 and 10, control laws for determining displacement amounts for outboard and inboard flaps, and midspan flaps if present, are disclosed. The control laws described herein are designed to be implemented as computer instructions carried out by controller 423 or controller 623. Generally speaking, the control laws determine an amount of displacement that each of a primary motor, midspan motor, and/or outboard motor should provide to outboard, midspan, and inboard flaps.

These control laws are designed to provide an appropriate amount of movement to each motor, taking into account the fact that activation of each of the motors may move more than one flap. As an example, depending on the configuration of differential control devices, primary motor may cause inboard and outboard flaps to move, and may cause midspan flaps to move by a certain amount as well. More information relating to motion provided by each motor to each flap is described in more detail below, with respect to FIGS. 9 and 10.

It should be noted that while the control law contemplates that inputs will be inboard flap position and midspan and outboard differential position, other inputs to the control law could be provided. For example, instead of calculating the current outboard position 516, 1008 or current midspan position 1004, those positions could be measured and provided to the control law directly.

Referring to FIG. 9, a functional block diagram depicting control logic for determining displacement amounts for inboard flaps 212 and outboard flaps 213 is shown. This functional block diagram may be used for wing, control system, and method depicted in FIGS. 3, 5 and 7, respectively. Inputs to the block diagram include a flap lever position 462, a current differential position 464, 466, and a current inboard flap position 468.

The current flap lever position 462 is provided to a lookup table 508, which outputs an ideal outboard position 510 and ideal inboard flap position 512. Optionally, airplane weight 467, airplane altitude 469, and/or airspeed 471 may also be provided to the lookup table 508, which will provide appropriate outputs.

Current inboard flap position 468 is subtracted from current right differential position 464 at 514 to determine current right outboard flap position 516. The current right outboard flap position 516 is subtracted from ideal right outboard position 510 from the lookup table 508 at 518 to determine the total amount the right outboard flap will move 520.

Current inboard flap position 468 is subtracted from ideal inboard flap position 512 at 522 to determine a total amount inboard flap will move 524. This amount 524 will be commanded to primary motor 451 at 526.

The total amount inboard flap will move 524 will be subtracted from the total amount right outboard flap will move 520 at 528. The output is commanded to the right differential motor at 530.

If differential motor 455 is activated while primary motor 451 is activated, power will be provided to the outboard flaps 213 by both motors. Therefore, if it is desirable to move outboard flaps 213 by a displacement amount which is greater than the displacement amount of inboard flaps 212, differential motor 455 may be activated in the same direction as, and during activation of primary motor 451.

If it is desirable to move the outboard flaps 213 by a displacement amount which is less than the displacement amount of inboard flaps 212, differential motor 455 may be activated in the opposite direction as, but still during the activation of, the primary motor 451.

Finally, if it is desirable to move outboard flaps 213 by a displacement amount which is the same as the displacement amount of inboard flaps 212, differential motor 455 need not be activated. Instead, differential brake 442 may be set in order to prevent differential motion of outboard flaps 213 with respect to inboard flaps 212. In this case, only primary motor 451 will be required to be activated, and it will be used to move both inboard flaps 212 and outboard flaps 213 by the same amount.

The procedures shown and described for determining the commanded amount for movement of right outboard differential motor and movement of right midspan differential motor are also used to determine commanded movement for left outboard differential motor 529 with current left outboard differential position 466 and ideal left outboard position 510 serving as inputs.

It should be noted that motors 455 and 451 need not be activated simultaneously in order to provide differential motion to inboard, midspan and outboard flaps. Differential brakes 442 may be set to allow any or all surfaces to move together. Subsequently, differential motor 455 may be activated to provide differential motion to flaps 213.

Referring to FIG. 10, a functional block diagram depicting control logic for determining displacement amounts for inboard flaps 312, midspan flaps 316 and outboard flaps 313 is shown. This functional block diagram may be used for wing, control system, and method depicted in FIGS. 4, 6 and 8, respectively. Inputs to the block diagram include a flap lever position 662, current outboard differential position 680, 676, current midspan differential position 677, 679, and a current inboard flap position 678 As stated above, "differential position" represents an absolute measurement of the motion of the corresponding differential motor, from a zero position.

Current inboard flap position is added to current right midspan differential position at 1002, which results in current right midspan position 1004. Current right midspan position is added to current right outboard differential position at 1006, to provide current right outboard position 1008. Current right outboard position 1008 is subtracted from ideal right outboard position 1010 from the lookup table 1001 at 1012 to determine total amount right outboard flap will move 1014.

Current right midspan position 1004 is subtracted from ideal right midspan position from lookup table 1001 at 1018 to produce the total amount right midspan flap will move 1020.

Current inboard flap position 678 is subtracted from ideal inboard flap position 1022 at 1024 to determine the total amount inboard flap will move 1026. The amount inboard flap will move 1026 will be commanded to primary motor 633 at 483.

Total amount inboard flap will move 1026 will be subtracted from total amount right midspan flap will move 1020 at 1028. The result will be commanded to right midspan differential motor at 484.

Total amount right midspan flap will move 1020 will be subtracted from total amount right outboard flap will move 1014 at 1030 and the result will be commanded to right outboard differential motor at 485.

If midspan differential motor 655 is activated while primary motor 633 is activated, power will be provided to the midspan flaps 316 by both motors. Therefore, if it is desirable to move midspan flaps 316 by a displacement amount which is greater than the displacement amount of inboard flaps 312, midspan differential motor 655 may be activated in the same direction as, and during activation of primary motor 633.

If it is desirable to move the midspan flaps 316 by a displacement amount which is less than the displacement amount of inboard flaps 312, midspan differential motor 655 may be activated in the opposite direction as, but still during the activation of, the primary motor 633.

Finally, if it is desirable to move midspan flaps 316 by a displacement amount which is the same as the displacement amount of inboard flaps 312, midspan differential motor 655 need not be activated. Instead, midspan differential brake 652 may be set in order to prevent differential motion of midspan flaps 316 with respect to inboard flaps 312. In this case, only primary motor 633 will be required to be activated, and it will be used to move both inboard flaps 312 and midspan flaps 316 by the same amount.

For motion of outboard flaps 313, outboard differential motor 644 provides motion with respect to motion provided by midspan differential 651. Therefore, if outboard differential motor 644 is activated while midspan flaps 316 are moving, outboard flaps 313 will be provided with power by both midspan differential 651 and by outboard differential motor 644, and outboard flaps 313 will move differentially with respect to midspan flaps 316.

If it is desirable to move outboard flaps 313 by a displacement amount which is greater than the displacement amount of midspan flaps 316, outboard differential motor 644 may be activated in the same direction as motion of the midspan flaps 316.

If it is desirable to move the outboard flaps 313 by a displacement amount which is less than the displacement amount of midspan flaps 316, outboard differential motor 644 may be activated in the opposite direction as motion of the midspan flaps 316.

Finally, if it is desirable to move outboard flaps 313 by a displacement amount which is the same as the displacement amount of midspan flaps 316, outboard differential motor 644 need not be activated. Instead, outboard differential brake 642 may be set in order to prevent differential motion of outboard flaps 313 with respect to midspan flaps 316.

The procedures shown and described for determining the commanded amount for movement of right outboard differential motor and movement of right midspan differential motor are also used to determine commanded movement for left midspan differential motor 482 and left outboard differential motor 481, with current left midspan differential position 677, current left outboard differential position 676, ideal left midspan position 1040 and ideal left outboard position 1042.

It should be noted that motors 633, 644 and 655 need not be activated simultaneously in order to provide differential motion to inboard, midspan and outboard flaps. Differential brakes 652, 642 may be set to allow any or all surfaces to move together. Subsequently, differential motors 644, 655 may be activated to provide differential motion to flap surfaces 316, 312.

Systems and methods are therefore provided which generate differential motion between flap surfaces such that optimal efficiency is provided during the take-off and landing flight envelope.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiments for carrying out this invention disclosed hereinabove.

We claim:

1. A method for differentially adjusting a first deployable lift device on an aircraft wing and a second deployable lift device on the aircraft wing during takeoff and landing, wherein said first deployable lift device and said second deployable lift device are coupled to a single power drive link coupled to a controller, said method comprising:
    determining in the controller a first desired position for said first deployable lift device on the aircraft wing and a second desired position for said second deployable lift device on the aircraft wing, based on a desired position signal during takeoff and landing;
    receiving in the controller a first current position of said first deployable lift device;
    determining in the controller a second current position of said second deployable lift device by subtracting the first current position of said first deployable lift device from a current differential position;
    activating a first motor to move said first deployable lift device by a first total movement amount, said first total movement amount being determined by subtracting the first current position of said first deployable lift device from said first desired position;
    determining in the controller a second total movement amount for said second deployable lift device by subtracting the second current position of said second deployable lift device from said second desired position;
    determining in the controller a first differential movement amount by subtracting said first total movement amount from said second total movement amount;
    activating a second motor to move said second deployable lift device by said first differential movement amount;
    determining a third total movement amount for a third deployable lift device on the aircraft wing by subtracting a third current position of said third deployable lift device from a third desired position for said third deployable lift device;
    determining a second differential movement amount for said third deployable lift device by subtracting said second total movement amount from said third total movement amount; and
    activating a third motor to move said third deployable lift device by said second differential movement amount.

2. The method of claim 1, wherein:
said first desired position and said second desired position are further determined based on an aircraft weight, altitude and airspeed.

3. The method of claim 1, further comprising:
engaging a first differential brake prior to activating said first motor;
disengaging said first differential brake after moving said first deployable lift device is complete; and
activating said second motor.

4. The method of claim 1, further comprising:
determining said second current position by adding said first current position to a first differential position.

5. The method of claim 1, further comprising:
determining said third current position by adding said second current position to a second differential position.

6. The method of claim 1, further comprising:
engaging a second differential brake prior to activating said second motor;
disengaging said second differential brake after moving said second deployable lift device is complete; and
activating said third motor.

7. An aircraft wing system for differentially adjusting a first deployable lift device on an aircraft wing and a second deployable lift device on the aircraft wing during takeoff and landing, said system comprising:
a first deployable lift device on the aircraft wing;
a second deployable lift device on the aircraft wing, wherein said first deployable lift device and said second deployable lift device are coupled to a single power drive link;
a high horsepower motor providing power to said power drive link;
a first low horsepower motor;
a first differential configured to receive power from said drive link and said first low horsepower motor, and to provide power to said second deployable lift device; and
a controller programmed to:
determine a first desired position for said first deployable lift device and a second desired position for said second deployable lift device, based on a desired position signal during takeoff and landing;
activate said high horsepower motor to move said first deployable lift device by a first total movement amount, said first total movement amount being determined by subtracting a first current position of said first deployable lift device from said first desired position;
determine a second total movement amount for said second deployable lift device by subtracting a second current position of said second deployable lift device from said second desired position;
determine a first differential movement amount by subtracting said first total movement amount from said second total movement amount;
activate said first low horsepower motor to move said second deployable lift device by said first differential movement amount;
determine a third total movement amount for said third deployable lift device by subtracting a third current position of said third deployable lift device from a third desired position;
determine a second differential movement amount for said third deployable lift device by subtracting said second total movement amount from said third total movement amount; and
activate a second low horsepower motor to move said third deployable lift device by said second differential movement amount.

8. The system of claim 7, wherein:
said controller is programmed to determine said first desired position and said second desired position based on an aircraft weight, altitude and airspeed.

9. The system of claim 7, wherein:
said controller is further programmed to:
engage a first differential brake prior to activating said high horsepower motor;
disengage said first differential brake after moving said first deployable lift device is complete; and
activate said first low horsepower motor.

10. The system of claim 7, wherein:
said controller is further programmed to determine a second current position by adding said first current position to a first differential position.

11. The system of claim 7, wherein:
said controller is further programmed to:
determine said third current position by adding said second current position to a second differential position.

12. The system of claim 7, wherein:
said controller is further programmed to:
engage a second differential brake prior to activating said first low horsepower motor;
disengage said second differential brake and engage said first differential brake after moving said second deployable lift device is complete; and
activate said second low horsepower motor.

13. An aircraft employing an aircraft wing system for differentially adjusting a first deployable lift device, a second deployable lift device and a third deployable lift device during takeoff and landing, said aircraft comprising:
an aircraft body;
a wing having a first deployable lift device, a second deployable lift device and a third deployable lift device wherein said first deployable lift device on the wing and said second deployable lift device on the wing are coupled to a single power drive link;
a high horsepower motor providing power to said power drive link;
a first low horsepower motor;
a first differential control device configured to receive power from said drive link and said first low horsepower motor, and to provide power to said second deployable lift device; and
a controller programmed to:
determine a first desired position for said first deployable lift device on the wing and a second desired position for said second deployable lift device on the wing, based on a desired position signal during takeoff and landing;
activate said high horsepower motor to move said first deployable lift device by a first total movement amount, said first total movement amount being determined by subtracting a first current position of said first deployable lift device from said first desired position;
determine a second total movement amount for said second deployable lift device by subtracting a second current position of said second deployable lift device from said second desired position;
determine a first differential movement amount by subtracting said first total movement amount from said second total movement amount;
activate said first low horsepower motor to move said second deployable lift device by said first differential movement amount;

determine a third total movement amount for said third deployable lift device by subtracting a third current position of said third deployable lift device from a third desired position;

determine a second differential movement amount for said third deployable lift device by subtracting said second total movement amount from said third total movement amount; and activate a second low horsepower motor to move said third deployable lift device by said second differential movement amount.

14. The system of claim 13, wherein:

said controller is programmed to determine said first desired position and said second desired position based on an aircraft weight, altitude and airspeed.

15. The system of claim 13, wherein:

said controller is further programmed to:

engage a first differential brake prior to activating said high horsepower motor;

disengage said first differential brake after moving said first deployable lift device is complete; and activate said first low horsepower motor.

16. The system of claim 13, wherein:

said controller is further programmed to determine a second current position by adding said first current position to a first differential position.

17. The system of claim 13, wherein:

said controller is further programmed to:

determine said third current position by adding said second current position to a second differential position.

* * * * *